(12) United States Patent
Lin et al.

(10) Patent No.: US 10,663,694 B2
(45) Date of Patent: May 26, 2020

(54) CAMERA LENS

(71) Applicant: AAC ACOUSTIC TECHNOLOGIES (SHENZHEN) CO., LTD, Shenzhen (CN)

(72) Inventors: ChiaCheng Lin, Shenzhen (CN); Hiroyuki Teraoka, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 183 days.

(21) Appl. No.: 16/057,966

(22) Filed: Aug. 8, 2018

(65) Prior Publication Data
US 2019/0250377 A1    Aug. 15, 2019

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS 8,873,165 B1 * 10/2014 Chung ............... G02B 13/0045
                                                                    359/714
9,759,895 B1 *  9/2017 Teraoka .................. G02B 9/60

* cited by examiner

*Primary Examiner* — Jack Dinh
(74) *Attorney, Agent, or Firm* — IPro, PLLC; Na Xu

(57) ABSTRACT

The present disclosure provides a camera lens which has good optical properties and a full image angle of above 76°, is ultra-thin, and comprises five lenses having a high luminous flux F number. The camera lens includes, from an object side to an image side, a first lens having a positive refractive power, a second lens having a negative refractive power, a third lens having a positive refractive power, a fourth lens having a positive refractive power and a fifth lens having a negative refractive power. The camera lens satisfies specified relational expressions.

3 Claims, 5 Drawing Sheets

CAMERA LENS

CROSS-REFERENCE TO RELATED APPLICATIONS

The present application claims priority to Japanese Patent Application No. JP2018-021669, filed on Feb. 9, 2018, the content of which is incorporated herein by reference in its entirety.

TECHNICAL FIELD

The present disclosure relates to a camera lens, and in particular to a camera lens which is suitable for use in a modular camera for a mobile phone, a WEB camera, or the like using a camera element such as a high-pixel CCD or CMOS, has good optical properties, is ultra-thin to the point that total track length (TTL)/image height (IH) is ≤1.45, has a full image angle (hereinafter, indicated as 2ω) of above 76°, and consists of five lenses having bright F-number (hereinafter referred to as Fno) of less than 2.25.

BACKGROUND

In recent years, various types of camera devices equipped with a camera element such as a CCD and CMOS and others have been widely used. Along with the development of miniature and high performance camera elements, the ultra-thin wide-angle camera lenses with good optical properties and bright Fno are needed.

The technology related to the camera lens composed of five ultrathin wide-angle lenses with good optical properties and bright Fno is being developed gradually. The camera lens is composed of five lenses, which are lined up from an object side in an order as follows: a first lens having a positive refractive power, a second lens having a negative refractive power, a third lens having a positive refractive power, a fourth lens having a positive refractive power and a fifth lens having a negative refractive power.

The camera lens disclosed in the embodiments of Patent Document 1 (listed as below) is the above-described camera lens constituted of five lenses. However, since the refractive power distribution of the first lens and the third lens and the shapes of the first lens and the second lens are not sufficient, the luminance and ultra-thinning level is not sufficient.

The camera lens disclosed in Embodiment 1 of Patent Document 2 (listed as below) is the above-described camera lens constituted of five lenses. However, since the refractive power distribution of the first lens and the third lens and the shape of the third lens are not sufficient, the ultra-thinning level is not sufficient.

PRIOR ART DOCUMENTS

Patent Documents

Patent Document 1: Japanese Patent Application Laid-Open No. 2015-225246;
Patent Document 2: Japanese Patent Application Laid-Open No. 2015-225102.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
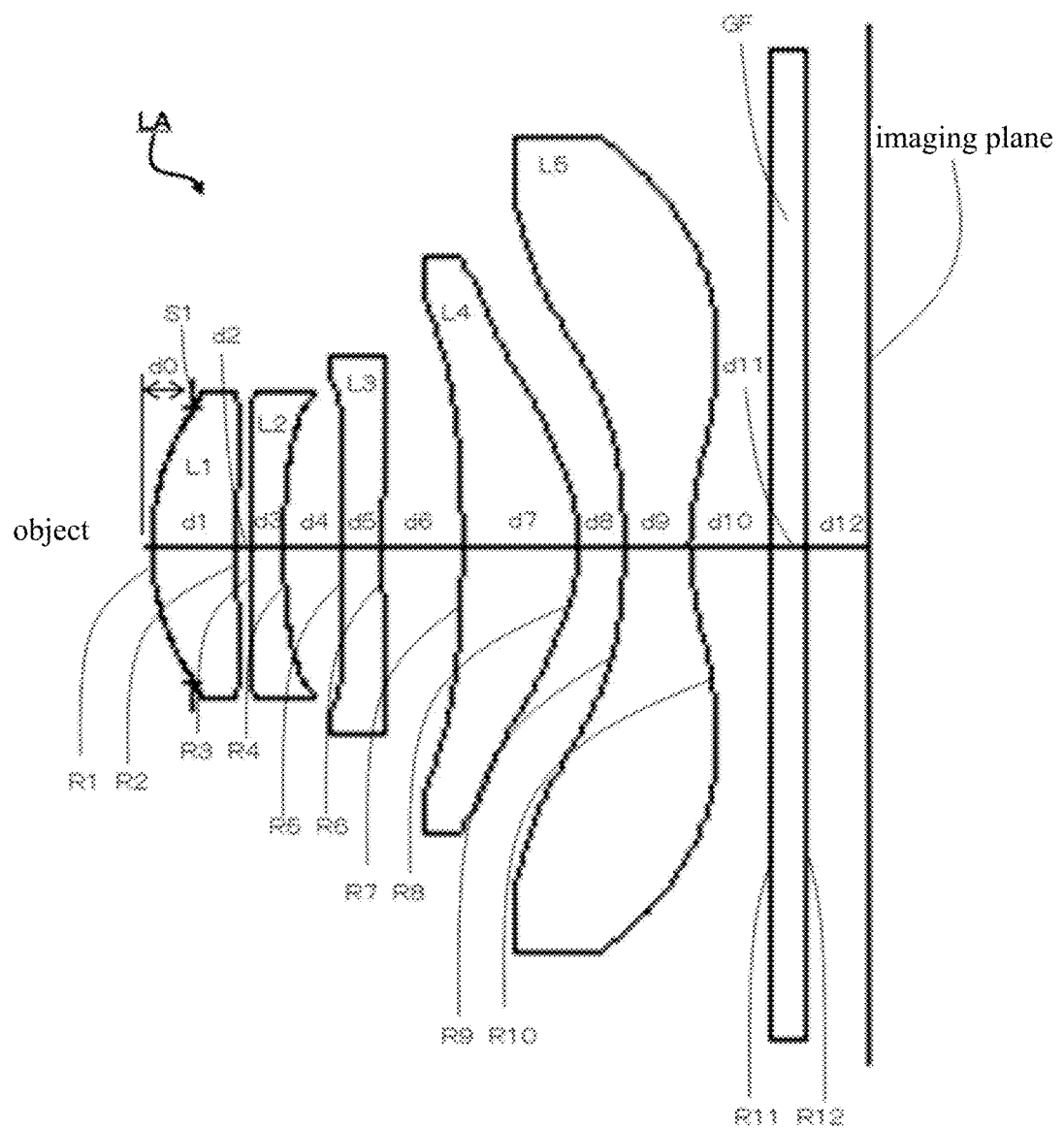
FIG. 1 is a structural diagram of a camera lens LA according to an embodiment of the present disclosure.

An embodiment of a camera lens according to the present disclosure will be described with reference to the drawings. A diagram showing a structure of the camera lens according to the embodiments of the present disclosure is as shown in FIG. 1. The camera lens LA has a five-lens system which includes a first lens L1, a second lens L2, a third lens L3, a fourth lens L4 and a fifth lens L5, which are arranged from an object side toward an image side. A glass plate GF is provided between the fifth lens L5 and an imaging plane. The glass plate GF can be a glass plate using a cover glass or having an IR cut-off filter and other functions. In addition, the glass plate GF may not be provided between the fifth lens L5 and the imaging plane.

The first lens L1 is a lens having a positive refractive power, the second lens L2 is a lens having a negative refractive power, the third lens L3 is a lens having a positive refractive power, the fourth lens L4 is a lens having a positive refractive power, and the fifth Lens L5 is a lens having a negative refractive power. With respect to the lens surfaces of these five lenses, it is preferable to make them be aspheric surfaces in order to satisfactorily correct various aberrations.

The camera lens LA satisfies the following relational expressions (1) to (4):

$$0.80 \leq f1/f \leq 0.90 \tag{1}$$

$$15.00 \leq f3/f \leq 25.00 \tag{2}$$

$$0.80 \leq (R3+R4)/(R3-R4) \leq 1.50 \tag{3}$$

$$-50.00 \leq (R5+R6)/(R5-R6) \leq -25.00 \tag{4},$$

in which:
f denotes an overall focal length of the lens system,
f1 denotes a focal length of the first lens,
f3 denotes a focal length of the third lens,
R3 denotes a curvature radius of the object side surface of the second lens,
R4 denotes a curvature radius of the image side surface of the second lens;
R5 denotes a curvature radius of the object side surface of the third lens; and R6 denotes a curvature radius of the image side surface of the third lens.

The relational expression (1) specifies the positive refractive power of the first lens L1. When it is out of the range of the relational expression (1), $2\omega \geq 76°$ and it is not preferable because it is difficult to make the camera lens ultra-thin and have a bright Fno.

Furthermore, it is further preferable to set the numerical range of the relational expression (1) as the numerical range of the following relational expression (1-A):

$$0.82 \leq f1/f \leq 0.85 \quad (1\text{-}A),$$

The relational expression (2) specifies the positive refractive power of the third lens L3. When it is out of the range of the relational expression (2), $2\omega \geq 76°$ and it is not preferable because it is difficult to make the camera lens ultra-thin and have a bright Fno.

Furthermore, it is further preferable to set the numerical range of the relational expression (2) as the numerical range of the following relational expression (2-A):

$$18.00 \leq f3/f \leq 22.00 \quad (2\text{-}A).$$

The relational expression (3) specifies the shape of the second lens L2. When it is out of the range of the relational expression (3), $2\omega \geq 76°$ and it is not preferable because it is difficult to make the camera lens ultra-thin and have a bright Fno.

Furthermore, it is further preferable to set the numerical range of the relational expression (3) as the numerical range of the following relational expression (3-A):

$$1.20 \leq (R3+R4)/(R3-R4) \leq 1.40 \quad (3\text{-}A).$$

The relational expression (4) specifies the shape of the third lens L3. When it is out of the range of the relational expression (4), $2\omega \geq 76°$ and it is not preferable because it is difficult to make the camera lens ultra-thin and have a bright Fno.

Furthermore, it is further preferable to set the numerical range of the relational expression (4) as the numerical range of the following relational expression (4-A):

$$-40.00 \leq (R5+R6)/(R5-R6) \leq -30.00 \quad (4\text{-}A).$$

The second lens L2 is a lens having negative refractive power, which satisfies the following relational expressions (5):

$$-2.50 \leq f2/f \leq -1.50 \quad (5),$$

in which
f denotes an overall focal length of the lens system,
f2 denotes a focal length of the second lens.

The relational expression (5) specifies the negative refractive power of the second lens L2. When it is out of the range of the relational expression (5), $2\omega \geq 76°$ and it is not preferable because it is difficult to make the camera lens ultra-thin and have a bright Fno.

Furthermore, it is further preferable to set the numerical range of the relational expression (5) as the numerical range of the following relational expression (5-A):

$$-2.00 \leq f2/f \leq -1.70 \quad (5\text{-}A).$$

The first lens L1 is a lens having a positive refractive power, and satisfies the following relational expression (6):

$$-2.00 \leq (R1+R2)/(R1-R2) \leq -1.20 \quad (6),$$

wherein
R1 denotes the curvature radius of the object side surface of the first lens, and
R2 denotes the curvature radius of the image side surface of the first lens.

The relational expression (6) specifies the shape of the first lens L1. When it is out of the range of the relational expression (6), $2\omega \geq 76°$ and it is not preferable because it is difficult to make the camera lens ultra-thin and have a bright Fno.

Furthermore, it is further preferable to set the numerical range of the relational expression (6) as the numerical range of the following relational expression (6-A):

$$-1.80 \leq (R1+R2)/(R1-R2) \leq -1.40 \quad (6\text{-}A).$$

Each of the five lenses constituting the camera lens LA satisfies the structure and relational expression described above, and it is possible to obtain a camera lens which has good optical properties and a full image angle of above 76°, is ultra-thin, and has a bright Fno value.

EMBODIMENTS f: the overall focal length of the camera lens LA;
f1: the focal length of the first lens L1;
f2: the focal length of the second lens L2;
f3: the focal length of the third lens L3;
f4: the focal length of the fourth lens L4;
f5: the focal length of the fifth lens L5;
Fno: F number;
$2\omega$: full image angle;
S1: aperture;
R: the curvature radius of the optical surface, which is the center curvature radius of the lens;
R1: the curvature radius of the object side surface of the first lens L1;
R2: the curvature radius of the image side surface of the first lens L1;
R3: the curvature radius of the object side surface of the second lens L2;
R4: the curvature radius of the image side surface of the second lens L2;
R5: the curvature radius of the object side surface of the third lens L3;
R6: the curvature radius of the image side surface of the third lens L3;
R7: the curvature radius of the object side surface of the fourth lens L4;
R8: the curvature radius of the image side surface of the fourth lens L4;
R9: the curvature radius of the object side surface of the fifth lens L5;
R10: the curvature radius of the image side surface of the fifth lens L5;
R11: the curvature radius of the object side surface of the glass plate GF;
R12: the curvature radius of the image side surface of the glass plate GF;
d: the center thickness of the lens or the distance between the lenses;
d0: the axial distance from the open aperture S1 to the object side surface of the first lens L1;
d1: the center thickness of the first lens L1;
d2: the axial distance from the image side surface of the first lens L1 to the object side surface of the second lens L2;
d3: the center thickness of the second lens L2;
d4: the axial distance from the image side surface of the second lens L2 to the object side surface of the third lens L3;
d5: the center thickness of the third lens L3;

d6: the axial distance from the image side surface of the third lens L3 to the object side surface of the fourth lens L4;
d7: the center thickness of the fourth lens L4;
d8: the axial distance from the image side surface of the fourth lens L4 to the object side surface of the fifth lens L5;
d9: the center thickness of the fifth lens L5;
d10: the axial distance from the image side surface of the fifth lens L5 to the object side surface of the glass plate GF;
d11: the center thickness of the glass plate GF;
d12: the axial distance from the image side surface of the glass plate GF to the imaging plane;
nd: the refractive index of line d;
nd1: the refractive index of line d of the first lens L1;
nd2: the refractive index of line d of the second lens L2;
nd3: the refractive index of line d of the third lens L3;
nd4: the refractive index of line d of the fourth lens L4;
nd5: the refractive index of line d of the fifth lens L5;
nd6: the refractive index of line d of the glass plate GF;
v: the Abbe number;
v 1: the Abbe number of the first lens L1;
v 2: the Abbe number of the second lens L2;
v 3: the Abbe number of the third lens L3;

number Table 1, and a conic coefficient k and an aspheric coefficient as shown in Table 2.

TABLE 1

|  | R | d |  | nd | v d |
|---|---|---|---|---|---|
| S1 | ∞ | d0= | −0.260 |  |  |
| R1 | 1.43313 | d1= | 0.523 | nd1 1.5439 | v 1 55.95 |
| R2 | 7.98153 | d2= | 0.080 |  |  |
| R3 | 35.45109 | d3= | 0.208 | nd2 1.6510 | v 2 21.51 |
| R4 | 3.92575 | d4= | 0.346 |  |  |
| R5 | 3.86859 | d5= | 0.256 | nd3 1.6510 | v 3 21.51 |
| R6 | 4.12226 | d6= | 0.495 |  |  |
| R7 | −7.43123 | d7= | 0.714 | nd4 1.5439 | v 4 56.12 |
| R8 | −1.09064 | d8= | 0.279 |  |  |
| R9 | −4.91442 | d9= | 0.406 | nd5 1.5352 | v 5 56.12 |
| R10 | 1.32189 | d10= | 0.500 |  |  |
| R11 | ∞ | d11= | 0.210 | nd6 1.5168 | v 6 64.17 |
| R12 | ∞ | d12= | 0.397 |  |  |

TABLE 2

| | conic coefficient | aspheric coefficient | | | | | | |
|---|---|---|---|---|---|---|---|---|
| | k | A4 | A6 | A8 | A10 | A12 | A14 | A16 |
| R1 | 2.3460E−01 | −1.0735E−02 | 1.2204E−02 | −2.4845E−01 | 9.0516E−01 | −1.6314E+00 | 1.4251E+00 | −5.3578E−01 |
| R2 | 9.5914E+00 | −1.2411E−01 | −2.6034E−02 | 1.0494E+00 | −2.4358E+00 | 1.8534E+00 | −1.8993E−01 | −2.0532E−01 |
| R3 | −5.9093E+00 | −1.7141E−01 | 3.3605E−01 | 6.8241E−01 | −2.5394E+00 | 2.3768E+00 | −4.8423E−01 | −1.2969E−01 |
| R4 | 1.2126E+01 | −1.0881E−01 | 2.9260E−01 | 6.0366E−01 | −3.3874E+00 | 6.4715E+00 | −6.1424E+00 | 2.4507E−00 |
| R5 | 1.2006E+01 | −2.6289E−01 | 1.0185E−01 | −2.3552E−01 | 7.4799E−01 | −1.4279E+00 | 1.3876E+00 | −5.5398E−01 |
| R6 | −8.1210E+00 | −1.3902E−01 | −1.0486E−02 | 7.1114E−02 | −4.2435E+02 | 9.6060E−03 | 2.2510E−02 | −1.1314E−02 |
| R7 | 1.6283E+01 | 3.4032E−02 | −6.3020E−02 | 3.2514E−02 | −5.8052E−00 | −7.4559E−05 | −2.3234E−02 | 1.3775E−04 |
| R8 | −5.1085E+00 | −1.3019E−01 | 1.9060E−01 | −2.4159E−01 | 1.9365E−01 | −8.1474E−02 | 1.6802E−02 | −1.3574E−03 |
| R9 | −2.4180E−01 | −9.9204E−02 | −9.1419E−03 | 3.2518E−02 | −1.0585E−02 | 1.1722E−03 | 5.0000E−06 | −6.4314E−06 |
| R10 | −8.2200E+00 | −1.0907E−01 | 5.1881E−02 | −2.0063E−02 | 5.2021E−03 | −8.5937E−04 | 7.9337E−05 | −3.0356E−06 | v 4: the Abbe number of the fourth lens L4;
v 5: the Abbe number of the fifth lens L5;
v 6: the Abbe number of the glass plate GF;
TTL: optical length (the axial distance from the object side surface of the first lens L1 to the imaging plane); and
LB: the axial distance from the image side surface of the fifth lens L5 to the imaging plane (including the thickness of the glass plate GF).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (7)$$

R is the axial curvature radius, k is the conic coefficient, and A4, A6, A8, A10, A12, A14, and A16 are aspheric coefficients.

For the sake of convenience, the aspheric surface represented by the relational expression (7) is used as an aspheric surface of each of the lenses. However, the present disclosure is not limited to the aspheric surface represented by the relational expression (7).

Embodiment 1

Figure 2:
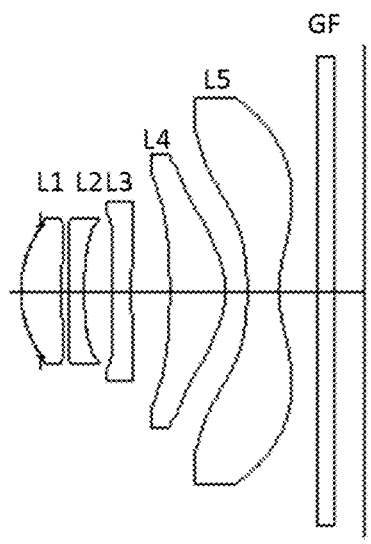
FIG. 2 is a structural diagram of the above-described camera lens LA according to Embodiment 1.

FIG. 2 is a structural diagram of the camera lens LA of Embodiment 1. Each of the first lens L1 to the fifth lens L5 constituting the camera lens LA of Embodiment 1 has a curvature radius of R of the object side and image side, a center thickness of the lens or a distance d between the lenses, a refractive index nd, and an Abbe number v Abbe Table 5 below shows the numerical values defined in Embodiments 1 and 2 and the numerical values corresponding to the parameters specified by the relational expressions (1) to (6).

As shown in Table 5, Embodiment 1 satisfies the relational expressions (1) to (6).

Figure 3:
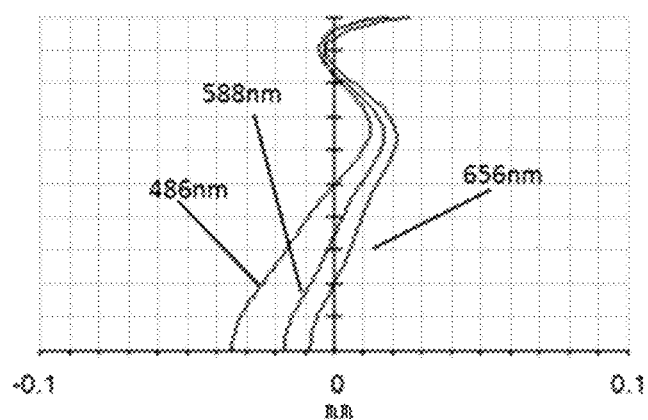
FIG. 3 is a diagram of a spherical aberration of the camera lens LA of Embodiment 1.
Figure 4:
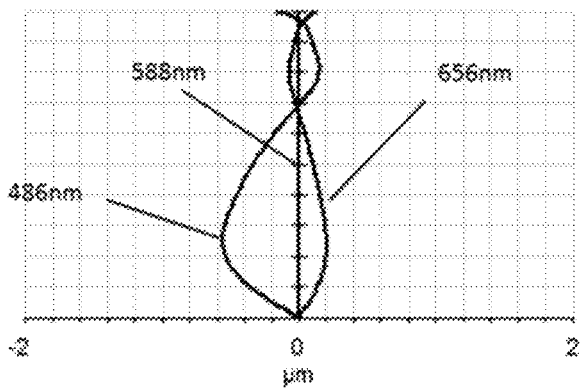
FIG. 4 is a diagram of a magnification chromatic aberration of the camera lens LA of Embodiment 1.
Figure 5:
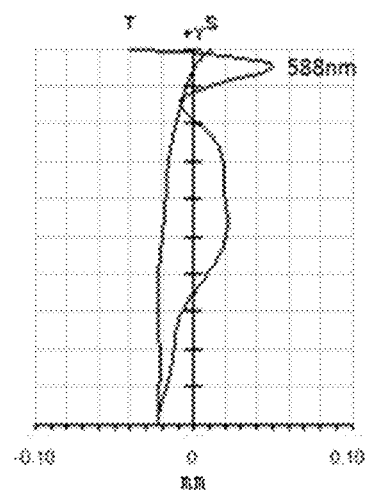
FIG. 5 is a diagram of field curvature and distortion of the camera lens LA of Embodiment 1.
Figure 5:
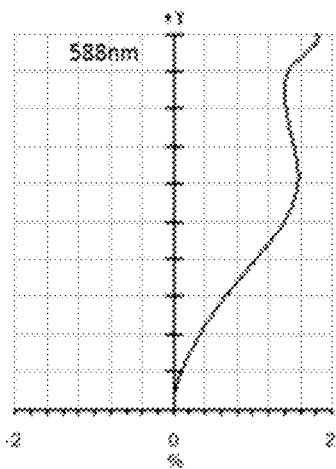

The spherical aberration of the camera lens LA of Embodiment 1 is as shown in FIG. 3, the magnification chromatic aberration of magnification thereof is as shown in FIG. 4, and the field curvature and the distortion are as shown in FIG. 5. Furthermore, the field curvature S in FIG. 5 is the field curvature for the sagittal imaging plane, and T is the field curvature for the meridianal imaging plane, and the same applies to Embodiment 2. As can be seen from FIGS. 3 to 5, the camera lens LA of Embodiment 1 has 2ω=79.4°, TTL/IH=1.403, Fno=2.20 and 2ω≥76° and is ultra-thin, thereby resulting in a bright Fno and good optical properties.

Embodiment 2

Figure 6:
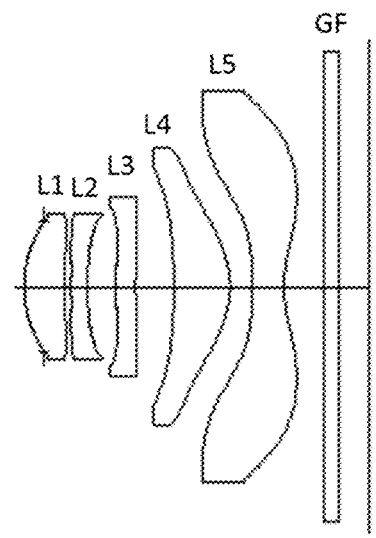
FIG. 6 is a structural diagram of the above-described camera lens LA according to Embodiment 2.

FIG. 6 is a structural diagram of the camera lens LA of Embodiment 2. Each of the first lens L1 to the fifth lens L5 constituting the camera lens LA of Embodiment 2 has a curvature radius of R of the object side and image side, a center thickness of the lens or a distance d between the lenses, a refractive index nd, and an Abbe number v as shown in Table 3, and a conic coefficient k and an aspheric coefficient as shown in Table 4.

TABLE 3

|    | R        | d           | nd       | νd        |
|----|----------|-------------|----------|-----------|
| S1 | ∞        | d0= −0.260  |          |           |
| R1 | 1.42589  | d1= 0.523   | nd1 1.5439 | ν1 55.95 |
| R2 | 8.05286  | d2= 0.080   |          |           |
| R3 | 34.03873 | d3= 0.208   | nd2 1.6510 | ν2 21.51 |
| R4 | 3.90337  | d4= 0.363   |          |           |
| R5 | 3.83965  | d5= 0.248   | nd3 1.6510 | ν3 21.51 |
| R6 | 4.09141  | d6= 0.492   |          |           |
| R7 | −6.84046 | d7= 0.717   | nd4 1.5439 | ν4 56.12 |
| R8 | −1.09907 | d8= 0.286   |          |           |
| R9 | −5.05385 | d9= 0.398   | nd5 1.5352 | ν5 56.12 |
| R10| 1.33317  | d10= 0.500  |          |           |
| R11| ∞        | d11= 0.210  | nd6 1.5168 | ν6 64.17 |
| R12| ∞        | d12= 0.389  |          |           |

TABLE 4

| | conic coefficient | aspheric coefficient | | | | | | |
|---|---|---|---|---|---|---|---|---|
| | k | A4 | A6 | A8 | A10 | A12 | A14 | A16 |
| R1 | 2.2551E−01 | −1.2431E−02 | 1.3372E−02 | −2.4711E−01 | 9.0417E−01 | −1.6340E+00 | 1.4240E+00 | −5.3056E−01 |
| R2 | 6.4218E+00 | −1.2600E−01 | −1.9085E−02 | 1.0545E+00 | −2.4365E+00 | 1.8495E+00 | −1.9122E−01 | −1.9987E−01 |
| R3 | −1.5000E−02 | −1.6901E−01 | 3.3595E−01 | 6.8575E−01 | −2.5326E+00 | 2.3826E+00 | −4.8450E−01 | −1.3931E−01 |
| R4 | 1.2292E+01 | −1.0510E−01 | 2.8557E−01 | 6.0612E−01 | −3.3840E+00 | 6.4676E+00 | −6.1467E+00 | 2.4632E+00 |
| R5 | 1.1252E+01 | −2.6677E−01 | 7.0207E−01 | −2.3818E−01 | 7.4461E−01 | −1.4274E+00 | 7.3915E+00 | −5.5370E−01 |
| R6 | −1.0146E+01 | −1.4116E−01 | −1.2180E−01 | 7.1194E−02 | −4.2162E−02 | 9.2642E−03 | 2.2174E−02 | −1.0437E−02 |
| R7 | 1.6659E+01 | 3.3363E−02 | −6.2830E−02 | 3.2796E−02 | −5.6474E−03 | −1.1231E−05 | −2.1683E−04 | 1.3668E−04 |
| R8 | −5.1274E+00 | −1.3074E−01 | 1.9047E−01 | −2.4165E−01 | 1.9363E−01 | −8.1479E−02 | 1.6803E−02 | −1.3549E−03 |
| R9 | −2.6160E−01 | −9.9197E−02 | −9.1468E−03 | 3.2523E−02 | −1.0532E−02 | 1.1729E−03 | 5.1733E−06 | −6.3844E−06 |
| R10 | −8.1562E+00 | −1.0994E−01 | 5.1955E−02 | −2.0057E−02 | 5.2028E−03 | −8.5919E−04 | 7.9388E−05 | −3.0236E−06 |

As shown in Table 5, Embodiment 2 satisfies the relational expressions (1) to (6).

Figure 7:
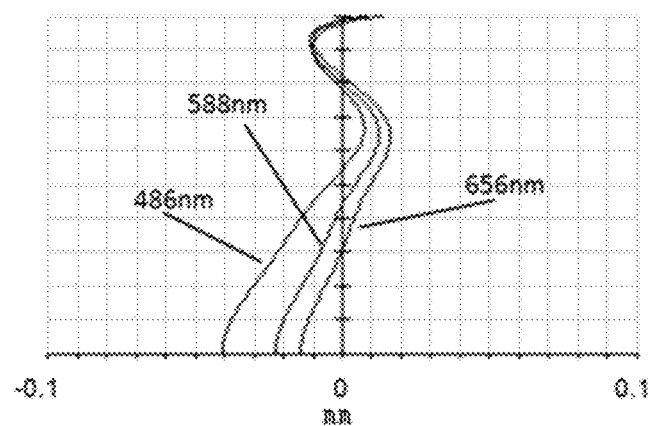
FIG. 7 is a diagram of a spherical aberration of the camera lens LA of Embodiment 2.
Figure 8:
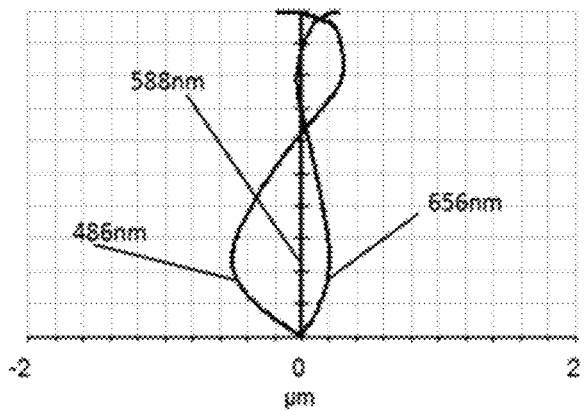
FIG. 8 is a diagram of a magnification chromatic aberration of the camera lens LA of Embodiment 2.
Figure 9:
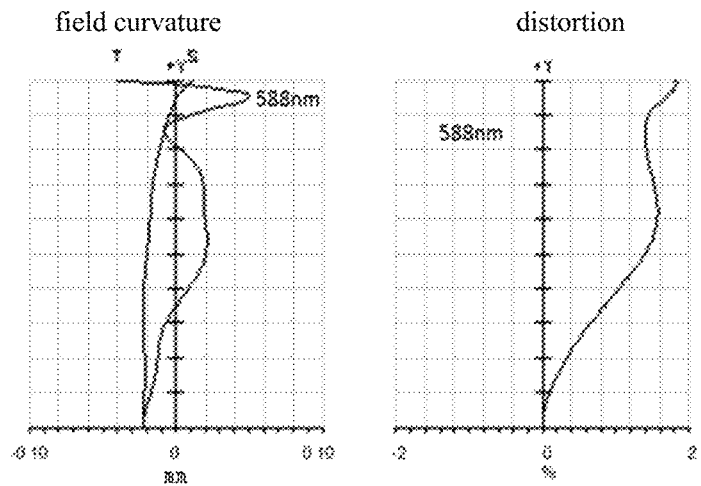
FIG. 9 is a diagram of field curvature and distortion of the camera lens LA of Embodiment 2.

The spherical aberration of the camera lens LA of Embodiment 2 is as shown in FIG. 7, the magnification chromatic aberration of magnification thereof is as shown in FIG. 8, and the field curvature and the distortion are as shown in FIG. 9. As can be seen from FIGS. 7 to 9, the camera lens LA of Embodiment 2 has 2ω=79.1°, TTL/IH=1.403, is ultra-thin to Fno=2.20 and has 2ω≥76°, thereby resulting in a bright Fno good optical properties.

TABLE 5

|  | Embodiment 1 | Embodiment 2 | Notes |
|---|---|---|---|
| f1/f | 0.840 | 0.831 | Exp(1) |
| f3/f | 18.587 | 18.539 | Exp(2) |
| (R3 + R4)/(R3 − R4) | 1.249 | 1.259 | Exp(3) |
| (R5 + R6)/(R5 − R6) | −31.500 | −31.502 | Exp(4) |
| f2/f | −1.829 | −1.824 | Exp(5) |
| (R1 + R2)/(R1 − R2) | −1.438 | −1.430 | Exp(6) |
| Fno | 2.20 | 2.20 | |
| 2ω | 79.4 | 79.1 | |
| TTL/IH | 1.403 | 1.403 | |
| f | 3.717 | 3.725 | |
| f1 | 3.124 | 3.097 | |
| f2 | −6.800 | −6.792 | |
| f3 | 69.092 | 69.048 | |
| f4 | 2.258 | 2.304 | |
| f5 | −1.903 | −1.929 | |
| TTL | 4.414 | 4.414 | |
| LB | 1.107 | 1.099 | |
| IH | 3.147 | 3.147 | |

LIST OF REFERENCE SIGNS

LA: camera lens
S1: open aperture
L1: the first lens
L2: the second lens
L3: the third lens
L4: the fourth lens
L5: the fifth lens
GF: glass plate
R: the curvature radius of the optical surface, which is the center curvature radius of the lens
R1: the curvature radius of the object side surface of the first lens L1
R2: a curvature radius of the image side surface of the first lens L1
R3: a curvature radius of the object side surface of the second lens L2
R4: a curvature radius of the image side surface of the second lens L2
R5: a curvature radius of the object side surface of the third lens L3
R6: a curvature radius of the image side surface of the third lens L3
R7: a curvature radius of the object side surface of the fourth lens L4
R8: a curvature radius of the image side surface of the fourth lens L4
R9: a curvature radius of the object side surface of the fifth lens L5
R10: a curvature radius of the image side surface of the fifth lens L5
R11: a curvature radius of the object side surface of the glass plate GF
R12: a curvature radius of the image side surface of the glass plate GF
d: the center thickness of the lens or the distance between the lenses
d0: the distance from the open aperture S1 to the object side surface of the first lens L1
d1: the center thickness of the first lens L1
d2: the axial distance from the image side surface of the first lens L1 to the object side surface of the second lens L2
d3: the center thickness of the second lens L2
d4: the axial distance from the image side surface of the second lens L2 to the object side surface of the third lens L3
d5: the center thickness of the third lens L3
d6: the axial distance from the image side surface of the third lens L3 to the object side surface of the fourth lens L4
d7: the center thickness of the fourth lens L4
d8: the axial distance from the image side surface of the fourth lens L4 to the object side surface of the fifth lens L5
d9: the center thickness of the fifth lens L5 d10: the axial distance from the image side surface of the fifth lens L5 to the object side surface of the glass plate GF d11: the center thickness of the glass plate GF d12: the axial distance from the image side surface of the glass plate GF to the imaging plane.

What is claimed is:

1. A camera lens, comprising, from an object side to an image side: a first lens having a positive refractive power, a second lens having a negative refractive power, a third lens having a positive refractive power, a fourth lens having a positive refractive power and a fifth lens having a negative refractive power, the camera lens satisfying following relational expressions (1) to (4):

$$0.80 \leq f1/f \leq 0.90 \tag{1}$$

$$15.00 \leq f3/f \leq 25.00 \tag{2}$$

$$0.80 \leq (R3+R4)/(R3-R4) \leq 1.50 \tag{3}$$

$$-50.00 \leq (R5+R6)/(R5-R6) \leq -25.00 \tag{4}$$

wherein f denotes an overall focal length of the camera lens, f1 denotes a focal length of the first lens, f3 denotes a focal length of the third lens, R3 denotes a curvature radius of an object side surface of the second lens, R4 denotes a curvature radius of an image side surface of the second lens;

R5 denotes a curvature radius of an object side surface of the third lens; and

R6 denotes a curvature radius of an image side surface of the third lens.

2. The camera lens according to claim 1, wherein:

the camera lens satisfies following relational expression (5):

$$-2.50 \leq f2/f \leq -1.50 \tag{5}$$

wherein f2 denotes a focal length of the second lens.

3. The camera lens according to claim 1, wherein:

the camera lens satisfies following relational expression (6):

$$-2.00 \leq (R1+R2)/(R1-R2) \leq -1.20 \tag{6}$$

wherein

R1 denotes a curvature radius of an object side surface of the first lens, and

R2 denotes a curvature radius of an image side surface of the first lens.

* * * * *